(12) United States Patent
Kapoor et al.

(10) Patent No.: US 6,792,514 B2
(45) Date of Patent: Sep. 14, 2004

(54) METHOD, SYSTEM AND COMPUTER PROGRAM PRODUCT TO STRESS AND TEST LOGICAL PARTITION ISOLATION FEATURES

(75) Inventors: Shakti Kapoor, Austin, TX (US); Jayakumar N. Sankarannair, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 09/881,920

(22) Filed: Jun. 14, 2001

(65) Prior Publication Data

US 2002/0194437 A1 Dec. 19, 2002

(51) Int. Cl.$^7$ .......................... G06F 12/00; G06F 13/00
(52) U.S. Cl. ....................................... 711/153
(58) Field of Search ................................ 711/153, 173; 710/36; 709/215; 714/718

(56) References Cited

U.S. PATENT DOCUMENTS

| | | | | |
|---|---|---|---|---|
| 4,564,903 | A | | 1/1986 | Guyette et al. ............. 711/201 |
| 4,843,541 | A | | 6/1989 | Bean et al. .................... 710/36 |
| 5,345,590 | A | | 9/1994 | Ault et al. ...................... 709/1 |
| 5,659,756 | A | * | 8/1997 | Hefferon et al. ............ 710/200 |
| 5,802,354 | A | * | 9/1998 | Kubala et al. ............... 713/400 |
| 6,279,046 | B1 | * | 8/2001 | Armstrong et al. ............ 710/5 |
| 6,357,020 | B1 | * | 3/2002 | Bohizic et al. ............... 710/39 |
| 6,567,897 | B2 | * | 5/2003 | Lee et al. .................... 711/153 |
| 6,665,759 | B2 | * | 12/2003 | Dawkins et al. ............ 710/200 |

FOREIGN PATENT DOCUMENTS

EP    1089173 A2 *  4/2001

OTHER PUBLICATIONS

IBM Technical Dislosure Bulletin, vol. 39, No. 12, Dec. 1996, "Hypervisor High Performance Synchronous Dispatch for Coupled Systems", one page.

IBM Technical Disclosure Bulleting, vol. 38, No. 04, Apr. 1995, "VM MPG Operating as a DRF Hypervisor as a First Level Guest Under PR/SM", p. 325.

IBM Technical Disclosure Bulletin, vol. 36, No. 03, Mar. 1993, "Sharing Read–Only Memory among Multiple Logical Partitions", pp. 303–304.

IBM Technical Disclosure Bulletin, vol. 39, No. 12, Dec. 1996, "Highly Parallel Coupling Facility Emulator/Router with Shadowed Link Buffers", 2 pages.

IBM Technical Disclosure Bulletin, vol. 39, No. 06, Jun. 1996, "Coordinating Multiple Server Partitions to Enter Power–Save State", pp. 235–239.

* cited by examiner

*Primary Examiner*—Glenn Gossage
(74) *Attorney, Agent, or Firm*—Duke W. Yee; Mark E. McBurney; Stephen J. Walder, Jr.

(57) ABSTRACT

A method, system, and computer program product for testing enforcement of logical partitioning in a data processing system are provided. In one embodiment, a call to an interface routine of a logical partitioning enforcement software unit is generated and sent to the logical partitioning enforcement software unit. Generating a call to an interface routine may include, for example, pseudo-randomly selecting one of a valid interface routine and an invalid interface routine and generating a call to the selected interface routine. A reply is received from the logical partitioning enforcement software unit and compared with an anticipated reply. Responsive to a discrepancy between the reply and the anticipated reply, a user is notified of a problem, thus allowing the user to take appropriate actions to correct the problem.

26 Claims, 3 Drawing Sheets

METHOD, SYSTEM AND COMPUTER PROGRAM PRODUCT TO STRESS AND TEST LOGICAL PARTITION ISOLATION FEATURES

BACKGROUND OF THE INVENTION

1. Technical Field

The present invention relates generally to computer software and, more particularly, to stressing and testing logical partitioning features of a data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own LPAR firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Management of the partitioning may be different for different types of hardware. Some aspects of the partitioning are done in the hardware and some aspects are performed in the firmware which runs at a level more privileged than the privilege of the supervisory mode. One challenge in management of the partitions is in testing to make sure that the isolation and insulation of logical partitions is strictly enforced. The consequence of failure of this partition isolation can be very expensive to users. Furthermore, debugging this failure in the customer environment with production level operating systems and with all the customer applications can be extremely tedious and expensive if not impossible. Therefore, it would be advantageous to have a method, system, and apparatus for testing and stressing the hardware and firmware against malicious applications to ensure that the isolation and insulation of the partitions are secure before an LPAR system fails.

SUMMARY OF THE INVENTION

The present invention provides a method, system, and computer program product for testing enforcement of logical partitioning in a data processing system. In one embodiment, a call to an interface routine of a logical partitioning enforcement software unit is generated and sent to the logical partitioning enforcement software unit. A reply is received from the logical partitioning enforcement software unit and compared with an anticipated reply. Responsive to a discrepancy between the reply and the anticipated reply, a user is notified of a problem, thus allowing the user to take appropriate actions to correct the problem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
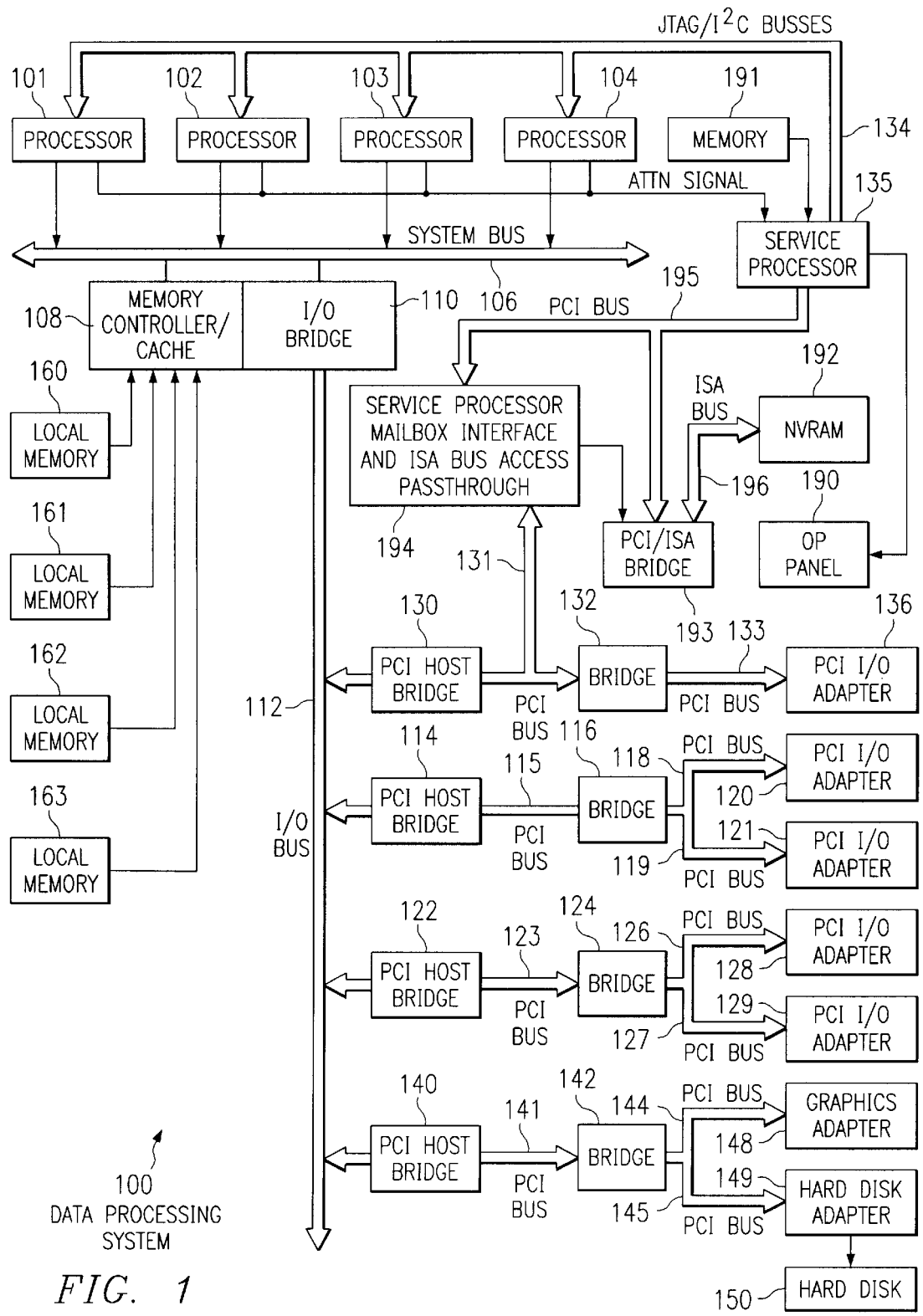
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110, or simply I/O bridge, is connected to system bus 106 and provides an interface to I/O bus 112. Memory controller/cache 108 and 110 bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of 110 adapters 120–121, 128–129, 136, and 148–149, each of processors 101–104, and each of local memories 160–163 is assigned to one of the three partitions. For example, processor 101, memory 160, and I/O adapters 120, 128, and 129 maybe assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to 110 bus 112 provides an interface to PCI local bus 115. A number of Input/Output adapters 120–121 may be connected to PCI bus 115 via bridge 116. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by a bridge 124 and PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and bridge 142 (PCI-PCI bridge) via PCI buses 141 and 144 as depicted. Also, a hard disk 150 may also be connected to I/O bus 112 through PCI Host Bridge 140, bridge 142 and hard disk adapter 149 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and Industry Standard Architecture (ISA) bus access pass-through logic 194 and bridge 132. The ISA bus access pass-through logic 194 forwards PCI accesses destined to the PCI/ISA bridge 193. The non-volatile random access memory (NV-RAM) storage is connected to the ISA bus 196. The Service processor 135 is coupled to the service processor mailbox interface 194 through its local PCI bus 195. Service processor 135 is also connected to processors 101–104 via a plurality of Joint Test Action Groups/Inter-IC (JTAG/I²C) busses 134. JTAG/I²C buses 134 are a combination of JTAG/scan busses (see Institute of Electrical and Electronics Engineers (IEEE) 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller/cache 108, and 110 bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into local (Host) memories 160–163. While the Host processors 101–104 are executing code from respective operating systems within the data processing system 100, service processor 135 enters a mode of monitoring and reporting errors. The type of items monitored by the service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
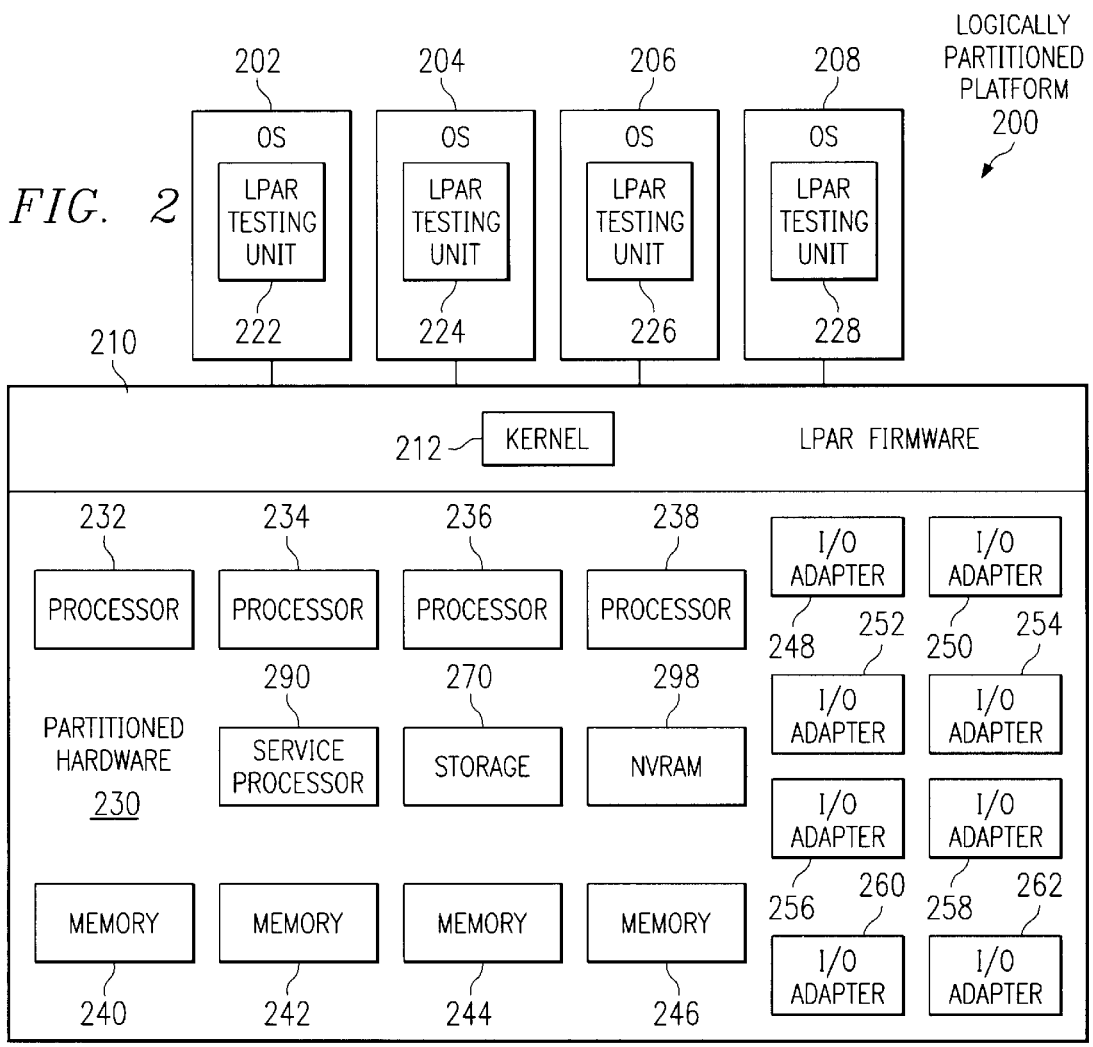
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically Partitioned (LPAR) platform 200 includes partitioned hardware 230, LPAR Firmware (LF) 210, and operating systems 202–208. Operating systems 202–208 may be multiple copies of a single operating system or multiple heterogeneous operating systems simultaneously run on platform 200. One or more of operating systems 202–208 may be a Test Nano Kernel (TnK) operating system. TnK is an OS meant specifically for creating an environment where stress exercisers can be written with ease and flexibility for speed, variation, and recreation of a failure. The TnK OS allows a programmer to create software and hardware irritations in a controlled manner to other partitions where another OS, such as, for example, AIX or Linux, is running.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

LF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

LF 210 is a firmware implemented virtual machine identical to the underlying hardware. Thus, LF 210 allows the simultaneous execution of independent OS images 202–208 by virtualizing all the hardware resources of logically partitioned platform 200. LF 210 may attach I/O devices through I/O adapters 248–262 to single virtual machines in an exclusive mode for use by one of OS images 202–208.

OS images 202–208 include an LPAR testing unit 222–228. LPAR testing units 222–228 generates and sends generate and send requests to the LPAR hardware and LF 210 attempting to access facilities assigned to a different partition. These requests are generated and sent by LPAR testing units 222–228 as rapidly as possible in an attempt to stress the system to determine whether any problems exist with the system which may cause a failure of the LPAR hardware or LF 210 which enables unauthorized access to a partition. Thus, LPAR testing unit 222–228 verifies under stress that the no violations of the isolation and insulation aspects of LPAR are violated by LPAR hardware by malicious applications. Thus ensuring that the LPAR hardware does not allow access to non-permitted resources. LPAR testing unit 222–228 also verifies, under stress, that the LF 210 does no allow malicious applications to gain access to non permitted resources. If non-permitted access is granted by the LF 210, this indicates that there is a software bug that must be identified and corrected. Therefore, if the LPAR hardware or the LF 210 does allow a non-permitted access, then a user or debug routine is notified that there is a problem with the logical partitioning in the system. The user or debug routine may then attempt to identify the problem such that it may be corrected.

Each OS 202–208 is modified, if necessary, to run under an LPAR system such that it relinquishes all LF 210 mode facilities and instead makes system calls to the LF 210 to access or manage the following facilities: hardware dependent registers, logical partition definition registers, support processor communication registers, special purpose register for general purpose, time base registers, data address breakpoint register, address space register, machine check enable bit in the Machine State Register (MSR), LF mode enable bit in MSR, and page table pointer register. In one exemplary partition mode, all interrupts except System Call Vectored (SCV) are sent to LF 210. In another exemplary partition mode, all interrupts except machine check, reset, and system calls with bit 20 on, are sent to the LPAR vector. The LPAR vector is the interrupt vector of a partition. OS's 202–208 are enabled to boot in a partition and manage the following facilities through LE 210: page table entries, support processor communication registers, special purpose register for general purpose, time base registers, data address breakpoint register, address space register, and LF 210 managed machine state register bits.

In some embodiments, one of OS's 202–208 is TnK while other ones of OS's 202–208 are other types of OS's, such as, for example, AIX or Linux, that may be typically used for commercial applications. TnK is capable of making performing actions that many other types of OS's are not capable of, thus allowing a greater stress to be placed on the system in determining whether the logical partitioning is strictly enforced by the LF 210 and hardware.

Those of ordinary skill in the art will appreciate that the hardware depicted in FIG. 2 may vary. For example, although depicted with an LPAR test unit in each partition's OS, in some embodiments, the LPAR test unit may be implemented in less than all the partitions. Furthermore, some embodiments may include other or different hardware from that depicted in FIG. 2. Also, some embodiments may also include unpartitioned hardware. The depicted example is not meant to imply architectural limitations with respect to the present invention.

Figure 3:
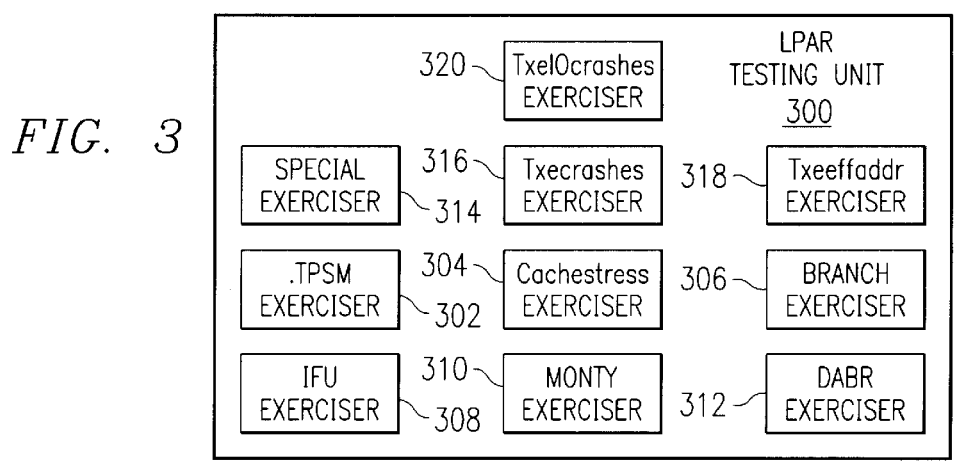
FIG. 3 depicts a block diagram illustrating an LPAR testing unit in accordance with the present invention.

With reference now to FIG. 3, a block diagram illustrating an LPAR testing unit is depicted in accordance with the present invention. LPAR testing unit 300 may be implemented as, for example, any of LPAR testing units 222–228 in FIG. 2. LPAR testing unit 300 includes Test for Storage Model (TPSM) exerciser 302, cache stress exerciser 304 (a methodical stress test for cache chips), branch exerciser 306 (a methodical stress test for the branch unit), Instruction Fetch Unit (IFU) exerciser 308 (a methodical stress test for the Instruction fetch unit), Monty exerciser 310 (a stress test for the 10 subsystem relative to the CEC), and Data Access Breakpoint Register (DABR) exerciser 312 (a methodical stress test for the Data Access Breakpoint register). LPAR testing unit 300 also includes a special exerciser 314.

Furthermore, there are other exercisers 316–320 designed specifically to go outside the partition. Txecrashes exerciser 316 pseudo-randomly stresses invalid accesses outside of its partition. Txeeffaddr exerciser 318 methodically stresses invalid accesses outside of its partition. TxeIOcrashes exerciser 320 stress tests the behavior of a misbehaved IO card in a partition.

All of these exercisers 302–320 run concurrently and, thus, produce a tremendous amount of stress on the LPAR firmware, such as LF 210 in FIG. 2, that manages the logical partitioning. The same LPAR firmware is used simultaneously by the other OS's in other partitions in the logically partitioned system. The amount of stress and variation of paths to the LPAR firmware in this heterogeneous environment is increased substantially with the presence of the LPAR testing unit 300 and its exercisers 302–320.

The OS in which the LPAR testing unit 300 runs should allow the exercisers 302–312 to create their own environment by allowing each exerciser 302–312 to: select between translation types RS6000 virtual and AS400PLS/SLS; translate data and or instructions; select supervisory or problem mode, select 32 bit mode or 64 bit mode in Machine State Register (MSR); create page table entries using the LPAR firmware; access hardware implementation dependent resources through the LPAR firmware; allocate any amount of contiguous real memory on any boundary; attach the memory to any effective address; manipulate segment registers, segment lookaside buffer (slb), or segment table as desired; and define its own interrupt vector. The operating system TnK inherently provides this feature. By allowing each exerciser 302–312 to create its own environment, each exerciser 302–312 may manipulate any memory with any boundary condition with many different instruction sequences and check that it does not violate any LPAR rules of memory accesses or of other resources. These accesses could either by directly through hardware or through the LPAR firmware managing the software controlled aspects of the logical partitioning.

In order to stress the LPAR firmware interface further, LPAR testing unit 300 includes special exerciser 314 to be used in conjunction with exercisers 302–312. Special exerciser 314 calls all the documented and undocumented LPAR firmware interface calls in the following manner:

call the interface routine with pseudo random valid values;

call the interface routine with pseudo random invalid values; and pseudo randomly attempt to call all invalid or nonexistent interface routines. Interface routines are identified by the LPAR firmware by virtue of a passed value in a register. Only certain values are valid; others are invalid or non-existent interface routines. It is pseudo randomly determined whether the routines will be called with valid or invalid values or whether an attempt to call an invalid routine will be made. All of these routine calls are made in a very efficient and rapid rate to make sure there is enough stress on the LPAR firmware which is also being used by OS's from other partitions. However the rate of generation is implementation dependent and varies depending on, for example, the speed of the processor utilized.

Those of ordinary skill in the art will appreciate that the components depicted in FIG. 3 may vary. Therefore, the depicted example is not meant to imply architectural limitations with respect to the present invention.

Figure 4:
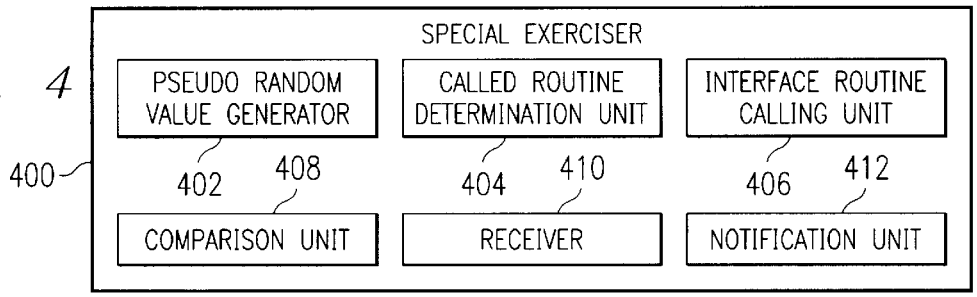
FIG. 4 depicts a block diagram illustrating an exemplary exerciser in accordance with the present invention.

With reference now to FIG. 4, a block diagram illustrating an exemplary exerciser is depicted in accordance with the present invention. Exerciser 400 may be implemented as, for example, any of exercisers 302–320 in FIG. 3. Exerciser 400 includes a pseudo random value generator 402, called routine determination unit 404, an interface routine calling unit 406, a comparison unit 408, a receiver 410, and a notification unit 412.

Called routine determination unit 404 pseudo randomly determines whether an invalid/nonexistent or valid LPAR firmware interface routine or other software or hardware routine will be called. If an invalid routine is chosen, called routine determination unit 404 generates a routine name and value to be called. If a valid routine is chosen, called routine determination unit 404 pseudo randomly determines whether a valid or invalid value will be used in calling the routine.

Pseudo random value generator generates a valid or invalid value, depending on the choice made by called routine determination unit 404, to be used when calling the routine. Interface routine calling unit 406 calls the selected valid or invalid interface routine from the LPAR firmware, LPAR hardware, or other LPAR software. Receiver 410 receives results from the called unit or other associated unit and comparison unit 408 compares the results with expected results. Notification unit 412 notifies an LPAR testing unit of any problems encountered.

For example, if the comparison unit 408 determines that the results indicate that access to a partition allocated to another partition was granted, then the notification unit 412 will send a notification to the LPAR testing unit indicating a breach in the enforcement of the logical partitioning. The notification unit 412 may also include a description of the type of problem encountered. For example, the problem may be that the LPAR firmware denies access to a facility when it should not, allows access to a facility when it should not, or produces unexpected results or allows access to facilities when presented with a call to an invalid routine. Once a problem has been identified and, perhaps the nature of the problem, then an administrator may utilize a debugging routine to locate the software problem within the LPAR firmware or locate the problem with a malfunctioning LPAR hardware device.

Those of ordinary skill in the art will appreciate that the components depicted in FIG. 4 may vary. Therefore, the depicted example is not meant to imply architectural limitations with respect to the present invention.

Figure 5:
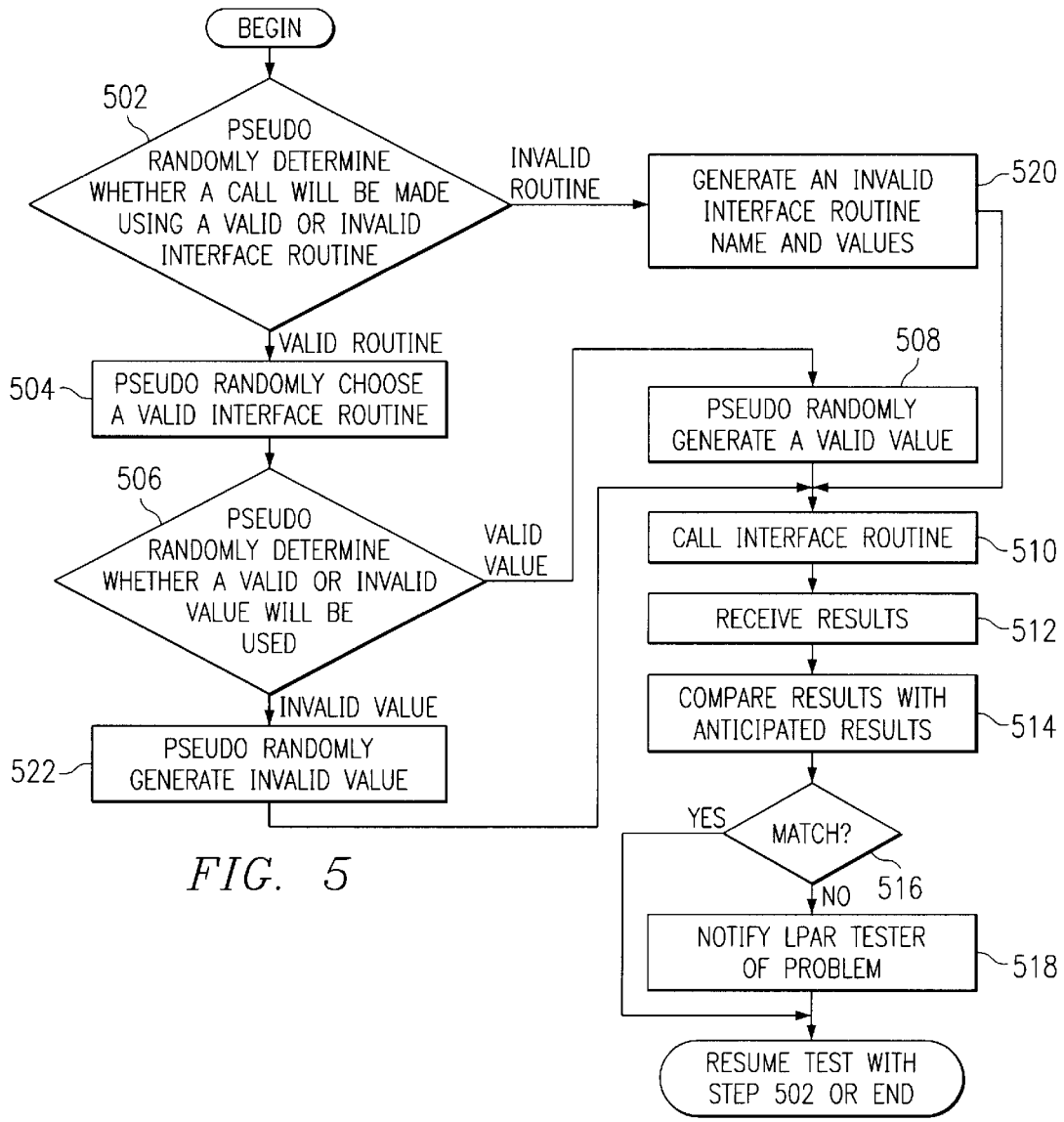
FIG. 5 depicts a process flow and program function for stressing and testing an LPAR system in accordance with the present invention.

With reference now to FIG. 5, a process flow and program function for stressing and testing an LPAR system is depicted in accordance with the present invention. The processes and functions illustrated in FIG. 5 may be implemented in, for example, exerciser 400 in FIG. 4. To begin, the exerciser pseudo randomly determines whether a call will be made to the LPAR unit using a valid or invalid interface routine (step 502). If an invalid routine is determined, then an invalid interface routine name and argument values are generated (Step 520). The exerciser then calls the LPAR unit using the invalid routine name (step 510).

If a valid routine is selected, then the exerciser pseudo randomly selects a valid interface routine name to be called (step 504). Next, it is pseudo-randomly determined whether a valid or invalid value will be used as the argument of the interface routine (step 506). If a valid value is to be used as the argument of the interface routine, then the exerciser pseudo randomly generates a valid value (step 508). If an invalid value is to be used, then an invalid argument value is pseudo randomly generated (step 522). Once the argument value has been generated, the selected LPAR system routine or hardware is called using the selected argument values (step 510).

The special exerciser then awaits and receives results from the called LPAR unit or an associated LPAR unit (step 512). These results are compared with anticipated results (step 514). For example, if the exerciser attempted to access resources belonging to a different partition, it would be anticipated that access would be denied. If the received results match the anticipated results (determined in step 516), then no further action is taken and the exerciser begins anew with step 502 in continuing to stress and test the LPAR firmware. However, if the received results are different from the anticipated results (determined in step 516), then the LPAR tester is notified of the problem (step 518) thus allowing corrective action to be taken. The processes illustrated in FIG. 5 are performed repeatedly as rapidly as desired (preferably as rapidly as possible) in an attempt to increase or maximize the stress on the LPAR firmware, LPAR hardware, and/or other LPAR resources and determine any weaknesses. The process continues until a user or other software determines that sufficient testing of the LPAR firmware has been performed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a Random Access Memory (RAM), Compact Disc Read Only Memories (CD-ROMs), Digital Video Disc Read Only Memory (DVD-ROMs), and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of testing enforcement of logical partitioning in a logically partitioned data processing system, the method comprising:
    generating a call to a unit within the logically partitioned data processing system;
    receiving a reply from the unit;
    comparing the reply with an anticipated reply; and
    responsive to a discrepancy between the reply and the anticipated reply, notifying a user of a problem.

2. The method as recited in claim 1, wherein the unit is an interface routine of a logical partitioning enforcement software unit.

3. The method as recited in claim 1, wherein the unit is in a different partition from the partition from which the call to the unit is generated.

4. The method as recited in claim 1, wherein the unit is a hardware device.

5. The method as recited in claim 2, wherein generating a call to an interface routine comprises:
    randomly selecting one of a valid interface routine and an invalid interface routine; and
    generating a call to the selected interface routine.

6. The method as recited in claim 5, wherein randomly selecting comprises pseudo randomly selecting.

7. The method as recited in claim 2, wherein generating a call to an interface routine comprises:
    randomly selecting one of a valid interface routine argument value and an invalid interface routine argument value;
    responsive to selection of the valid interface routine argument value, randomly generating a valid interface argument value;
    responsive to selection of the invalid interface routine argument value, randomly generating an invalid interface argument value; and
    calling the interface routine using the generated interface argument value.

8. The method as recited in claim 7, wherein randomly selecting comprises pseudo randomly selecting.

9. The method as recited in claim 7, wherein randomly generating a valid interface argument value comprises pseudo randomly generating a valid interface argument value.

10. The method as recited in claim 7, wherein randomly generating an invalid interface argument value comprises pseudo randomly generating an invalid interface argument value.

11. A method for testing enforcement of logical partitioning in a logically partitioned data processing system, the method comprising:
    repeatedly generating calls to one or more of a plurality of units within the logically partitioned data processing system;
    receiving responses to the calls from the one or more of the plurality of units; and
    generating an notification if one or more responses is inconsistent with an expected response.

12. A computer program product in a computer readable media for use in a logically partitioned data processing system for testing enforcement of logical partitioning in the logically partitioned data processing system, the computer program product comprising:
    generating instructions for generating a call to a unit within the logically partitioned data processing system;
    receiving instructions for receiving a reply from the unit;
    comparing instructions for comparing the reply with an anticipated reply; and
    notification instructions for notifying a user of a problem in response to a discrepancy between the reply and the anticipated reply.

13. The computer program product as recited in claim 12, wherein the unit is an interface routine of a logical partitioning enforcement software unit.

14. The computer program product as recited in claim 12, wherein the unit is assigned to a different partition from the partition from which the call to the unit is generated.

15. The computer program product as recited in claim 12, wherein the generating instructions comprise:
    selecting instructions for randomly selecting one of a valid interface routine and an invalid interface routine; and
    call generating instructions for generating a call to the selected interface routine.

16. The computer program product as recited in claim 15, wherein randomly selecting comprises pseudo randomly selecting.

17. The computer program product as recited in claim 12, wherein the generating instructions comprise:
    interface selection instructions for randomly selecting one of a valid interface routine argument value and an invalid interface routine argument value;
    valid argument instructions for randomly generating a valid interface argument value in response to selection of the valid interface routine argument value;
    invalid argument instructions for randomly generating an invalid interface argument value in response to selection of the invalid interface routine argument value; and
    interface calling instructions for calling the interface routine using the generated interface argument value.

18. The computer program product as recited in claim 17, wherein randomly selecting comprises pseudo randomly selecting.

19. The computer program product as recited in claim 17, wherein randomly generating a valid interface argument value comprises pseudo randomly generating a valid interface argument value.

20. The computer program product as recited in claim 17, wherein randomly generating an invalid interface argument value comprises pseudo randomly generating an invalid interface argument value.

21. A computer program product in a computer readable media for use in a logically partitioned data processing system for testing enforcement of logical partitioning in the logically partitioned data processing system, the computer program product comprising:
    generating instructions for repeatedly generating calls to one or more of a plurality of units within the logically partitioned data processing system;
    receiving instructions for receiving responses to the calls from the one or more of the plurality of units; and
    notifying instructions for generating a notification if one or more responses is inconsistent with an expected response.

22. A logical partitioning testing system for testing enforcement of logical partitioning in a logically partitioned data processing system, the system comprising:

a call generating unit which generates a call to a unit within the logically partitioned data processing system;

a receiver which receives a reply from the unit;

a comparison unit which compares the reply with an anticipated reply; and notifying unit which, responsive to a discrepancy between the reply and the anticipated reply, notifies a user of a problem.

23. The system as recited in claim 22, wherein the unit is an interface routine of a logical partitioning enforcement software unit.

24. The system as recited in claim 22, wherein the unit is in a different partition from the partition from which the call to the unit is generated.

25. The system as recited in claim 22, wherein the unit is a hardware device.

26. A logical partitioning testing system for testing enforcement of logical partitioning in a logically partitioned data processing system, the system comprising:

a call generating unit which repeatedly generates calls to one or more of a plurality of units within the logically partitioned data processing system;

a receiver which receives responses to the calls from the one or more of the plurality of units; and a notification generating unit which generates a notification if one or more responses is inconsistent with expected responses.

* * * * *

UNITED STATES PATENT AND TRADEMARK OFFICE
CERTIFICATE OF CORRECTION

PATENT NO. : 6,792,514 B2
DATED : September 14, 2004
INVENTOR(S) : Kapoor et al.

It is certified that error appears in the above-identified patent and that said Letters Patent is hereby corrected as shown below:

Column 5,
Line 15, after "testing units 222-228" delete "generates and sends".

Column 6,
Line 19, after "for the" delete "10" and insert -- IO --.

Signed and Sealed this

Twenty-fifth Day of October, 2005

JON W. DUDAS
*Director of the United States Patent and Trademark Office*